(No Model.) 2 Sheets—Sheet 1.

D. B. BURDETT.
FERTILIZER DISTRIBUTER.

No. 354,533. Patented Dec. 21, 1886.

Witnesses:
Wm B. Bebb
R. F. Porter

Inventor:
Daniel B. Burdett
By P. H. Gunckel
Attorney.

(No Model.) 2 Sheets—Sheet 2.
D. B. BURDETT.
FERTILIZER DISTRIBUTER.
No. 354,533. Patented Dec. 21, 1886.
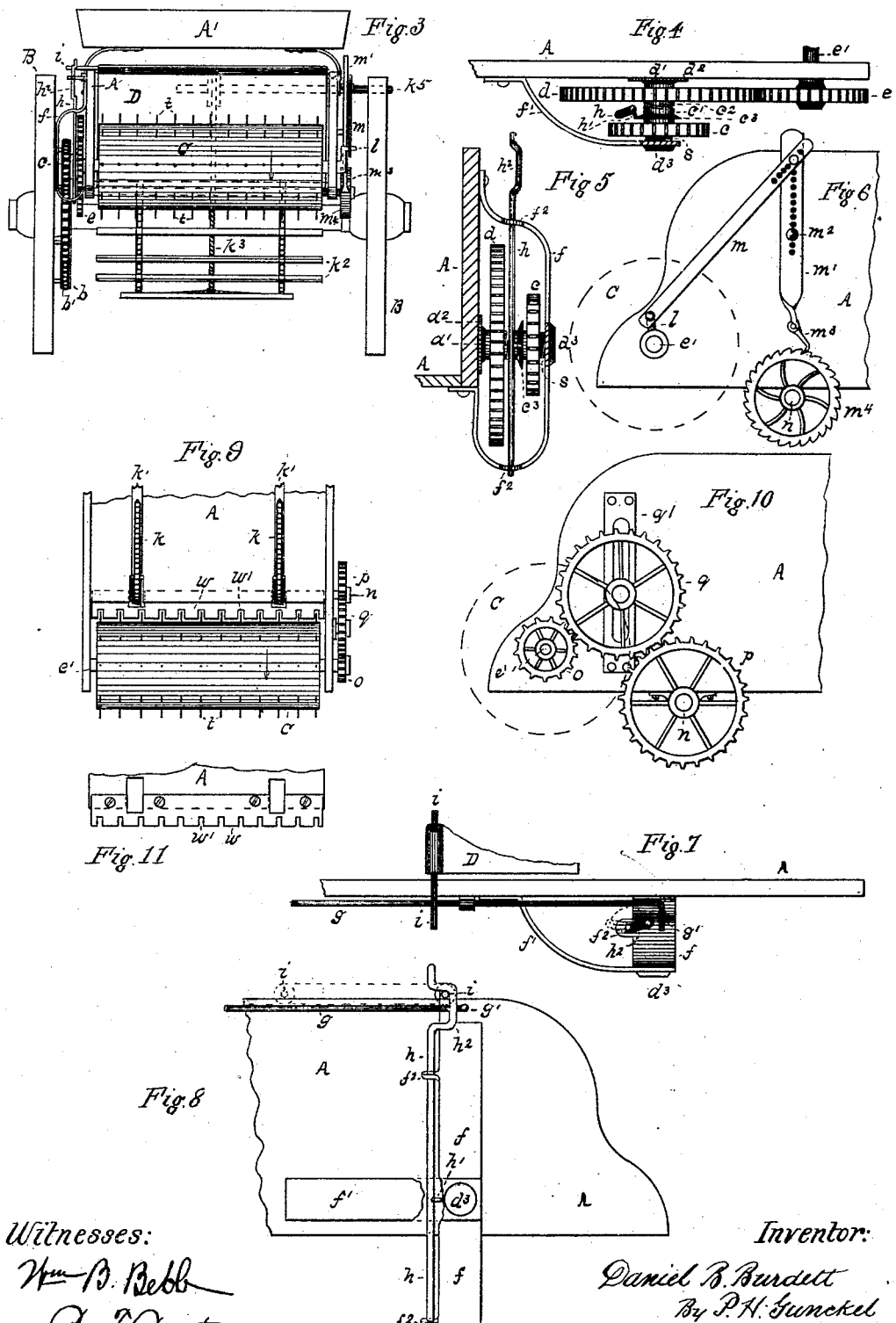
Witnesses:
Wm B. Bebb
R. T. Porter
Inventor:
Daniel B. Burdett
By P. H. Gunckel
Attorney

UNITED STATES PATENT OFFICE.

DANIEL B. BURDETT, OF MINNEAPOLIS, MINNESOTA.

FERTILIZER-DISTRIBUTER.

SPECIFICATION forming part of Letters Patent No. 354,533, dated December 21, 1886.

Application filed July 10, 1886. Serial No. 207,655. (No model.)

*To all whom it may concern:*

Be it known that I, DANIEL B. BURDETT, a subject of the Queen of Great Britain, residing at Minneapolis, in the county of Hennepin and State of Minnesota, have invented certain new and useful Improvements in Fertilizer-Distributers, of which the following is a specification.

My invention relates to apparatus for pulverizing and distributing fertilizers; and my improvements are illustrated in the accompanying drawings, in which—

Figure 1:
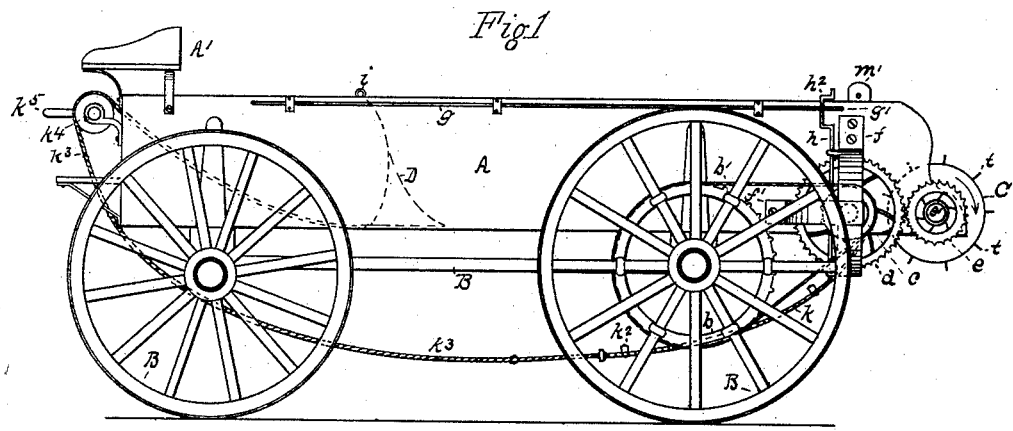
Figure 2:
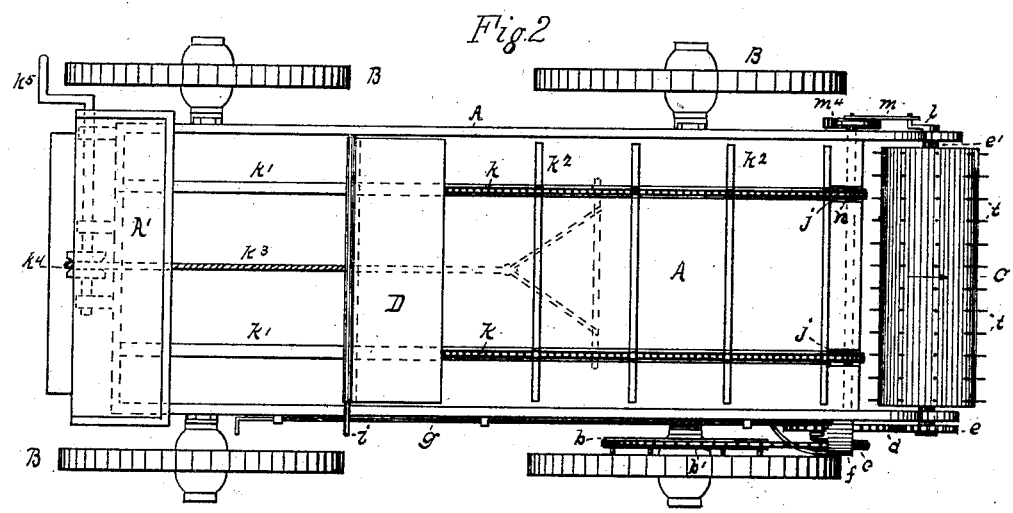

Figure 1 is a side elevation of a wagon provided with my improved apparatus. Fig. 2 is a plan view of the same. Fig. 3 is an end elevation of the same. Figs. 4, 5, 7, and 8 are detached views of portions of the mechanism for operating the distributing-cylinder. Figs. 6 and 10 are detached views of devices for operating the feed mechanism, and Figs. 9 and 11 are detail views of an attachment used in distributing finely-pulverized fertilizers.

The object of my invention is to provide a simple and efficient fertilizer-distributer; and the principal feature of my invention consists in a peculiar construction for automatically throwing the distributing-drum in and out of gear with the driving mechanism, as is hereinafter particularly described and claimed.

The vehicle illustrated is a wagon of ordinary construction, A representing the wagon-body, and B the running-gear. To one of the hind wheels is attached a chain-wheel, $b$, which is connected by an endless chain, $b'$, with a smaller chain-wheel, $c$, on a spindle, $d'$, at the side of the body A. A spur-wheel, $d$, fast on the spindle $d'$, meshes with a spur-wheel, $e$, on the end of the shaft $e'$ of the distributing-cylinder C. The cylinder C is thus rotated in the direction indicated by arrows by the forward movement of the wagon.

The spindle $d'$ has its inner end in a box, $d^2$, attached to the side of the wagon-body A, and its outer end in a journal-bearing, $d^3$, supported by a bracket, $f$, secured near the top of the wagon-body and curved outward around the wheels $c$ and $d$, and thence inward below them to the body, and is there also secured. The bracket is made firm by a lateral brace, $f'$, fastened to the side of the bed A.

The wheel $c$ is loose on the spindle $d'$, and has attached to it a clutch, $c'$, for engaging a clutch, $c^2$, on the hub of the wheel $d$. A spring, $s$, is interposed between the bracket $f$ and the hub of the wheel $c$, to hold the clutches in engagement. To throw the clutches out of engagement, and consequently stop the operation of the wheel $d$ and the mechanism driven by it, there is provided an upright crank-rod, $h$, having bearings in lips $f^2$ on the side of the bracket $f$, and having a wiper or cam, $h'$, for engaging a toe or flange, $c^3$, on the clutch $c'$, when the rod is turned. The crank $h^2$ and the wiper $h'$ are so arranged upon the rod that when the crank is inclined toward the front of the wagon the wiper will be free from the flange $c^3$, and when the rod is rotated about a half turn toward the right, so as to incline the crank rearward, the wiper will, by sliding contact with the clutch flange or toe, slide the clutch $c'$ out of engagement with the clutch $c^2$.

A scraper, D, is provided for moving the fertilizer toward the rear end of the box, and it is preferably placed in an inclined position, to facilitate the moving of the material. To the top of the scraper is attached a rod, $i$, that projects over the side of the wagon-box for turning the crank $h^2$ to its rearward position, when the scraper has progressed to the desired point in its rearward movement, and by this means the clutches are disengaged and the operation of the apparatus is stopped when the scraper has reached the rear of the wagon. When the scraper is drawn forward, the spring $s$ will force the wheels $c$ and $d$ and their connected mechanism back into gear. By this construction a perfectly-operating device is provided for, automatically throwing the distributing-drum C in and out of gear with its driving mechanism. The hand-rod $g$, provided with hook $g'$ at the rear and extending to within reach of the driver, is by way of an addition or re-enforcement of the automatic device, so as to enable the driver to throw the mechanism in and out of gear at will without regard to the position of the scraper, as may sometimes be desirable.

The scraper D is drawn rearward by chains $k$, operated by chain-wheels $j$, and slides along a track, $k'$. To the chains are attached cross-strips $k^2$, or projections of any suitable form, to loosen the fertilizing material at the bottom of the box and assist in moving it along. A rope, $k^3$, is attached to a cross-bar at the rear end of the chains and extends under the wagon-body and running-gear and over a pulley or windlass, $k^4$, under the driver's seat at the front of the wagon-bed, thence through to the front of the body to the scraper, to which its end is attached. A crank, $k^5$, at the side of the driver's seat is provided for turning the windlass $k^4$. The chains and rope form in effect an endless belt, and as the scraper is carried rearward by the mechanism hereinafter described the chains $k$ are drawn under the wagon by the rope $k^3$, and when it is desired to retract the scraper the crank $k^5$ is turned and the rope wound on and off the windlass, drawing the scraper to its position at the front of the wagon-box A.

On the shaft $e'$ of the cylinder C, at the side of the wagon opposite the gear-wheel $e$, is a crank, $l$, to which is connected a rod, $m$, which is adjustably pivoted to a lever, $m'$, having an adjustable fulcrum, $m^2$. The hinged pawl $m^3$, carried on the end of the lever $m$, engages a ratchet-wheel, $m^4$, on a shaft, $n$, journaled at the under side of the wagon-body.

The shaft $n$ carries the sprocket-wheels $j$, for operating the chains $k$. The rotation of the cylinder-shaft rotates the shaft $n$ intermittingly, and the extent of its intermittent rotation may be regulated by adjustment of the pivot of the rod and lever and the fulcrum $m^2$, so as to give the pawl $m^3$ a greater or less sweep in engaging the teeth of the ratchet-wheel.

Instead of the feed mechanism described, there may be used the gearing illustrated in Fig. 10, in which $o$ represents a pinion on the cylinder shaft $e'$; $p$, a gear-wheel on the chain-wheel shaft $n$; and $q$, an idle wheel in an adjustable bearing secured in a plate, $q'$, on the side of the wagon. The idle-wheel $q$ is mounted in an adjustable bearing, so that it can be removed and a larger or smaller wheel substituted for increasing or decreasing the speed of the wheel $p$.

By means of the gearing a constant movement of the chains and scrapers may be had. Such movement is deemed desirable in using the apparatus for distributing finely-pulverized fertilizers, and it is desirable in distributing such fertilizers to close a portion of the usual opening between the cylinder C and the end of the wagon-box, to prevent the passage of the fertilizer through the opening. For this purpose is provided the slotted plate $w$, which may be inserted into the opening and secured to the body by screws or otherwise, and detached when coarser material is to be distributed. The pins or teeth $t$ of the cylinder pass through the slots $w'$ of the plate and carry the fertilizing material upward over the cylinder. The cylinder C is made tight, and should be covered with sheet metal.

What I claim, and desire to secure by Letters Patent, is—

In a fertilizer-distributer, the automatic device described for throwing the distributing-drum C in and out of gear with the driving mechanism, which consists in the combination of the chain-wheel $c$, laterally movable on its supporting shaft $d'$, and provided with a clutch, $c'$, on its inner hub, having a flange, $c^3$, the gear-wheel $d$, engaging gear-wheel $e$ and provided with a clutch, $c^2$, on its outer hub, the lever-rod $h$, pivotally supported in the bearings $f^2$ $f^2$, extending vertically between said wheels $c$ and $d$, in close proximity to their hubs, and provided with the wiper $h'$, the crank $h^2$ at the top of lever-rod $h$, extending at right angles near to the wagon-body, the scraper D, provided with rod $i$, extending over top of sideboard of the wagon, means, substantially as described, for operating said scraper, and the spring L, placed on shaft $d'$ intermediate the outer hub of wheel $c$ and the outside piece of the bracket $f$, all substantially as described, for the purpose set forth.

DANIEL B. BURDETT.

Witnesses:
J. W. MOORE,
P. H. GUNCKEL.